United States Patent [19]

Gardei et al.

[11] Patent Number: 5,088,035
[45] Date of Patent: Feb. 11, 1992

[54] SYSTEM FOR ACCELERATING EXECUTION OF PROGRAM INSTRUCTIONS BY A MICROPROCESSOR

[75] Inventors: William F. Gardei, Downingtown, Pa.; Charles E. Hauck, Jr., Framingham, Mass.

[73] Assignee: Commodore Business Machines, Inc., West Chester, Pa.

[21] Appl. No.: 282,820

[22] Filed: Dec. 9, 1988

[51] Int. Cl.⁵ ............................ G06F 9/30; G06F 9/305
[52] U.S. Cl. .................................. 395/375; 364/262.4; 364/271.6; 364/263.1; 364/231.9; 364/DIG. 1
[58] Field of Search ... 364/200 MS File, 900 MS File

[56] References Cited

U.S. PATENT DOCUMENTS 4,594,655 6/1986 Hao et al. .......................... 364/200
4,635,188 1/1987 Williamson et al. ............... 364/200

Primary Examiner—Gareth D. Shaw
Assistant Examiner—Maria Napiorkowski
Attorney, Agent, or Firm—Panitch Schwarze Jacobs & Nadel

[57] ABSTRACT

A latch transfers fetched opcode to PLA for execution at the earliest opportunity following execution of a prior single cycle opcode.

7 Claims, 3 Drawing Sheets

SYSTEM FOR ACCELERATING EXECUTION OF PROGRAM INSTRUCTIONS BY A MICROPROCESSOR

FIELD OF THE INVENTION

The field of the invention is the design of the internal architecture of a microprocessor, particularly as it relates to the speed of execution of program instructions.

BACKGROUND OF THE INVENTION

Program instructions generally comprise one to three bytes. The first byte is known as the opcode; it specifies the operation to be performed. Instruction bytes following the opcode, if any, may be data or address bytes (or both).

An instruction is first fetched and then executed. In the fetch phase, the instruction is fetched from microprocessor memory and transferred to the microprocessor control unit (CU). The CU is implemented, for example, by microprogramming a programmable logic array (PLA). The CU sequences the operation of the entire microprocessor. It generates synchronization signals and manages the commands exchanged between the microprocessor unit (MPU), input/output device (I/O) and memory.

The CU must perform a memory fetch for each instruction byte. The CU is generally programmed to "know" the number of bytes in each instruction; that is, the CU knows whether to go back to memory to fetch additional bytes after fetching the first byte or opcode.

A program instruction requires one or more machine cycles to execute. In the 6500 family of microprocessors, a machine cycle corresponds to the period of a microprocessor clock ($\phi_2$), and a typical instruction can be executed in 1–7 machine cycles. The last machine cycle of any instruction includes the opcode fetch for the next instruction. During the opcode fetch, the appropriate program instruction is read from memory, and the instruction is gated over the data bus to the CU. Appropriate signals, including a SYNC pulse, are generated by the CU to execute a fetched instruction during the second half of a machine cycle. In the 6500 family of microprocessors, SYNC pulses cannot be generated every machine cycle due to the PLA characteristics. Thus, the SYNC pulse can at best be generated every other machine cycle. As a result, an instruction following a single byte instruction, i.e., an instruction which takes only one machine cycle to execute (referred to hereafter as a "single cycle" instruction), effectively occupies two machine cycles so that the next fetched instruction waits an extra machine cycle before it can be executed.

The present invention is directed to a technique for speeding up execution of program instructions, wherein at least one instruction can be executed in a single machine cycle, so that execution of the instruction following the single cycle instruction will begin in the very next machine cycle.

SUMMARY OF THE INVENTION

The invention is a system for accelerating the execution of program instructions by a microprocessor. A latch is coupled to the data bus and the PLA. A first opcode is fetched, gated over the data bus, and presented at the latch output for execution under control of the PLA. If a bit pattern in the first opcode indicates that the opcode can be executed in a single machine cycle, a pre-decode circuit generates a PRESYNC signal. While the first opcode is being executed, a second opcode is fetched and gated to the latch input. The second opcode is immediately transferred to the latch output during the next machine cycle based on the PRESYNC signal. Thus, where an instruction can be executed in a single machine cycle, the execution of the next instruction will begin in the very next machine cycle.

For the purpose of illustrating the invention, there is shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
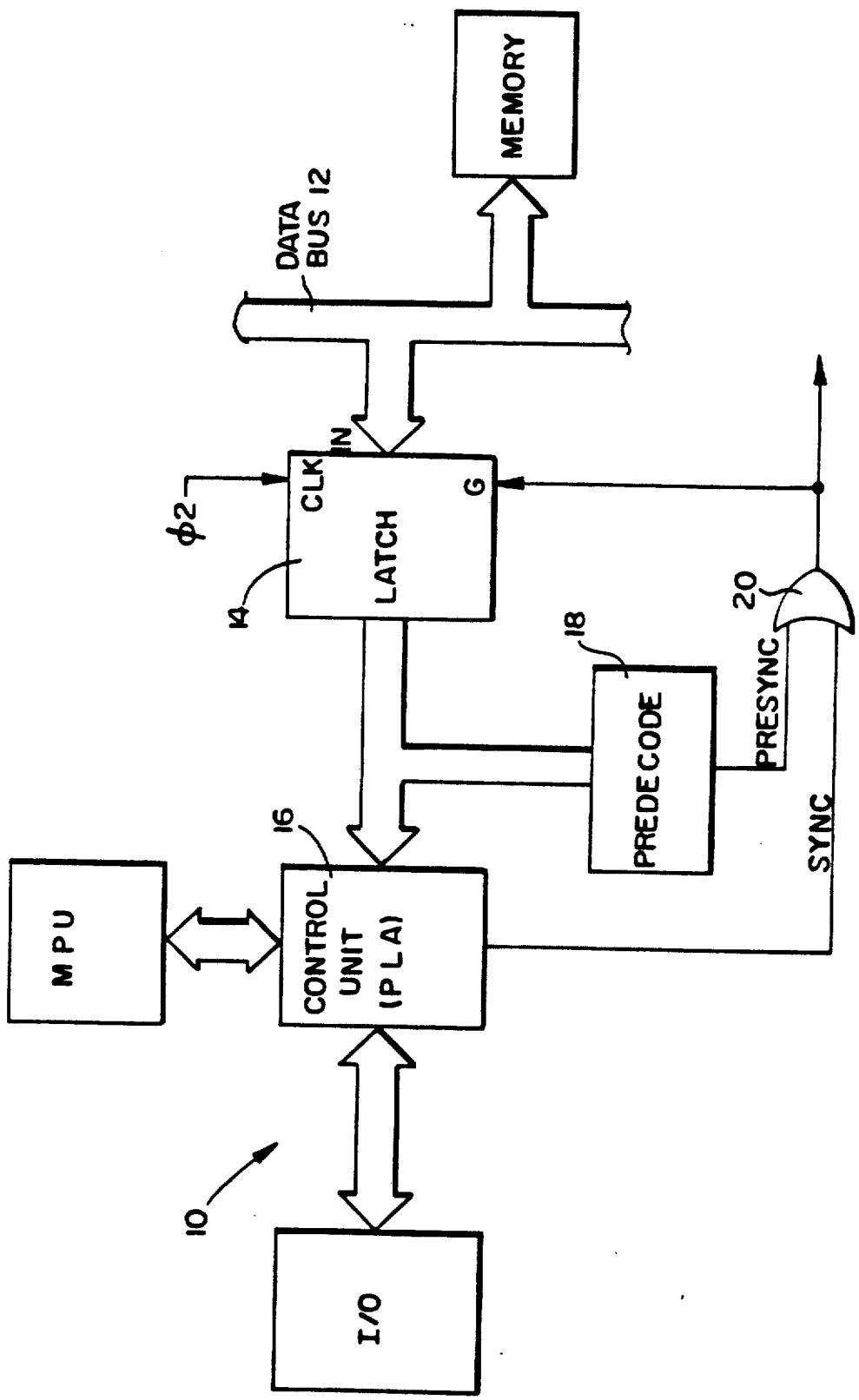
FIG. 1 is a block diagram of the system of the present invention.

Referring to the drawings, wherein like numerals indicate like elements, there is shown in FIG. 1 a system 10 according to the present invention for accelerating execution of program instructions wherein at least one instruction is a single cycle instruction. The instruction contains a single byte or opcode which is fetched from microprocessor memory and gated over a data bus 12 to the input (IN) of a latch 14. A latch input is transferred to the latch output (OUT) in response to a microprocessor clock pulse $\phi_2$ and a "high" signal appearing at the gate (G) of the latch. The latch output is fed to the PLA 16 and a pre-decode circuit 18. The PLA generates various control signals, utilized in executing an instruction, which are fed to various random logic components in conventional manner. In the 6500 series of microprocessors, for which the invention is particularly suited, the PLA generates a SYNC pulse during the last machine cycle of an instruction, i.e., the machine cycle during which an opcode fetch is performed for the next instruction to be executed.

Although in the 6500 microprocessor an opcode fetch can take place during execution of a prior instruction, the fetch does not begin until a SYNC pulse is generated by the PLA. In the present invention, a PRESYNC pulse is combined with the SYNC pulses so that a fetch is performed during a PRESYNC pulse or a SYNC pulse. If the prior opcode can be executed in a single machine cycle, then a fetch of the next instruction can begin during that machine cycle and execution of that instruction can begin at the very next machine cycle.

Figure 2:
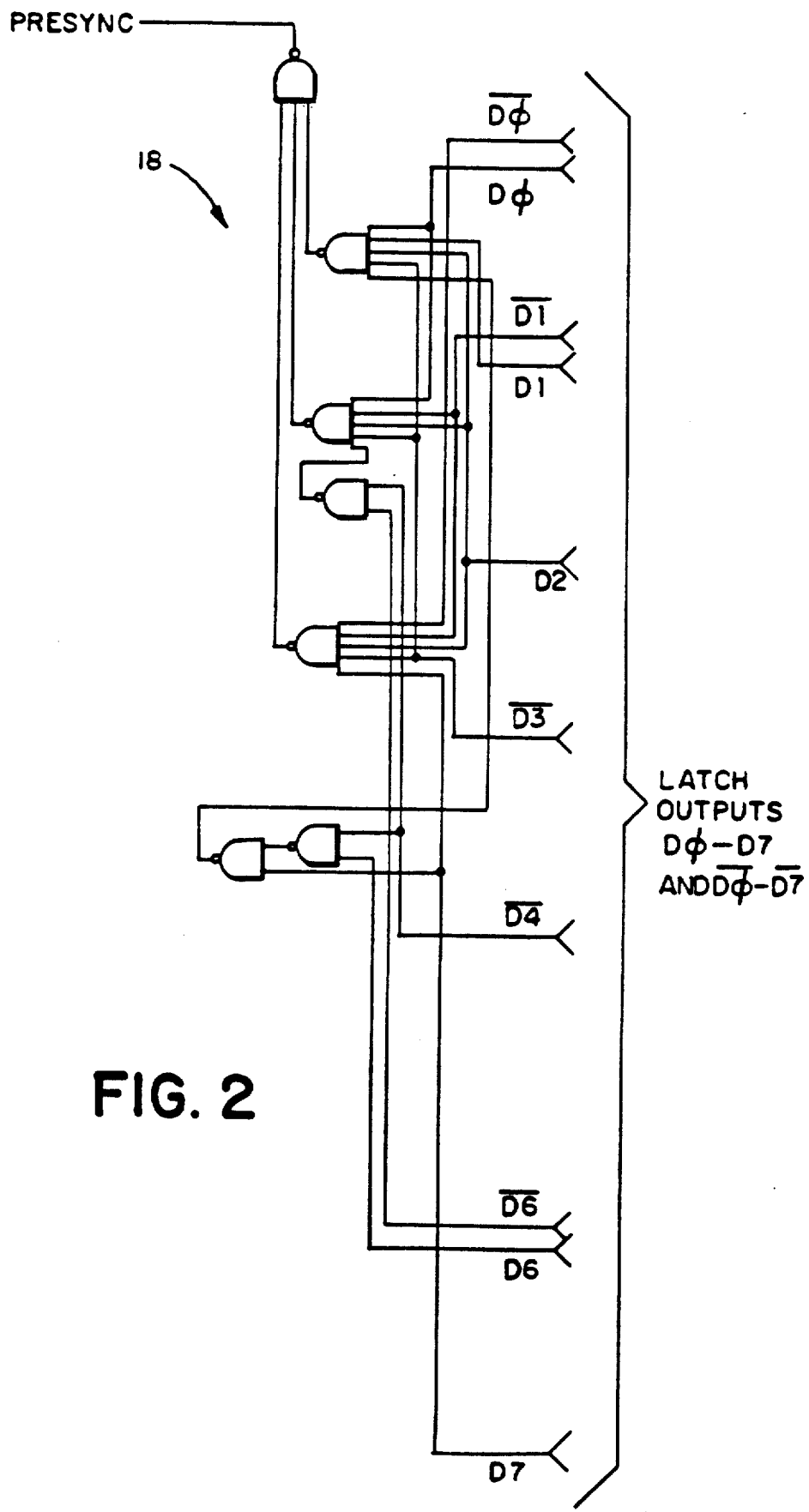
FIG. 2 is a logic diagram of an exemplary pre-decode circuit.

In the present invention, a bit pattern in the opcode indicates whether the opcode is a single cycle opcode, i.e., whether it can be executed in a single machine cycle. The single cycle opcode bit pattern is decoded by the pre-decode circuit 18. In general, the pre-decode circuit may assume the form shown in FIG. 2 wherein the latch output lines $D\phi$–D7 and $\overline{D\phi}$–$\overline{D7}$ are decoded to generate the PRESYNC signal. The SYNC and PRESYNC signals are logically combined by an OR gate 20 which drives the latch gate (G).

Figure 3:
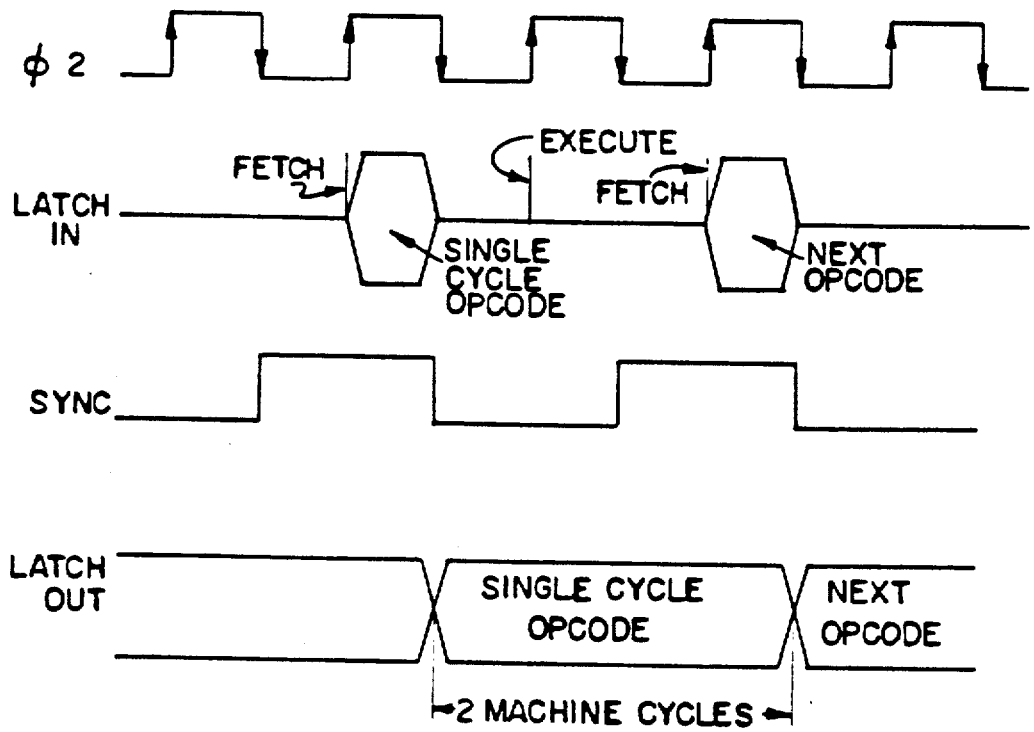
FIG. 3 is a group of waveforms showing conventional microprocessor operation for a single byte instruction which requires one machine cycle to execute (single cycle instruction).

Referring to FIG. 3, there are shown the waveforms corresponding to conventional microprocessor operation for a single cycle opcode, i.e., the microprocessor clock $\phi_2$, the data bus (latch IN), the SYNC signal, and the latch output (OUT). While the single cycle opcode is being fetched, the prior opcode is at the latch OUT (PLA IN). When the prior instruction has been executed, the single cycle opcode is gated from latch IN to latch OUT, i.e., to PLA IN. Execution of the single cycle opcode can then begin on the rising edge of the next clock pulse $\phi_2$. However, the next opcode cannot be fetched until the occurrence of the next SYNC pulse. Thus, two machine cycles must pass before the next opcode can be fetched and transferred to the latch outputs for execution.

Figure 4:
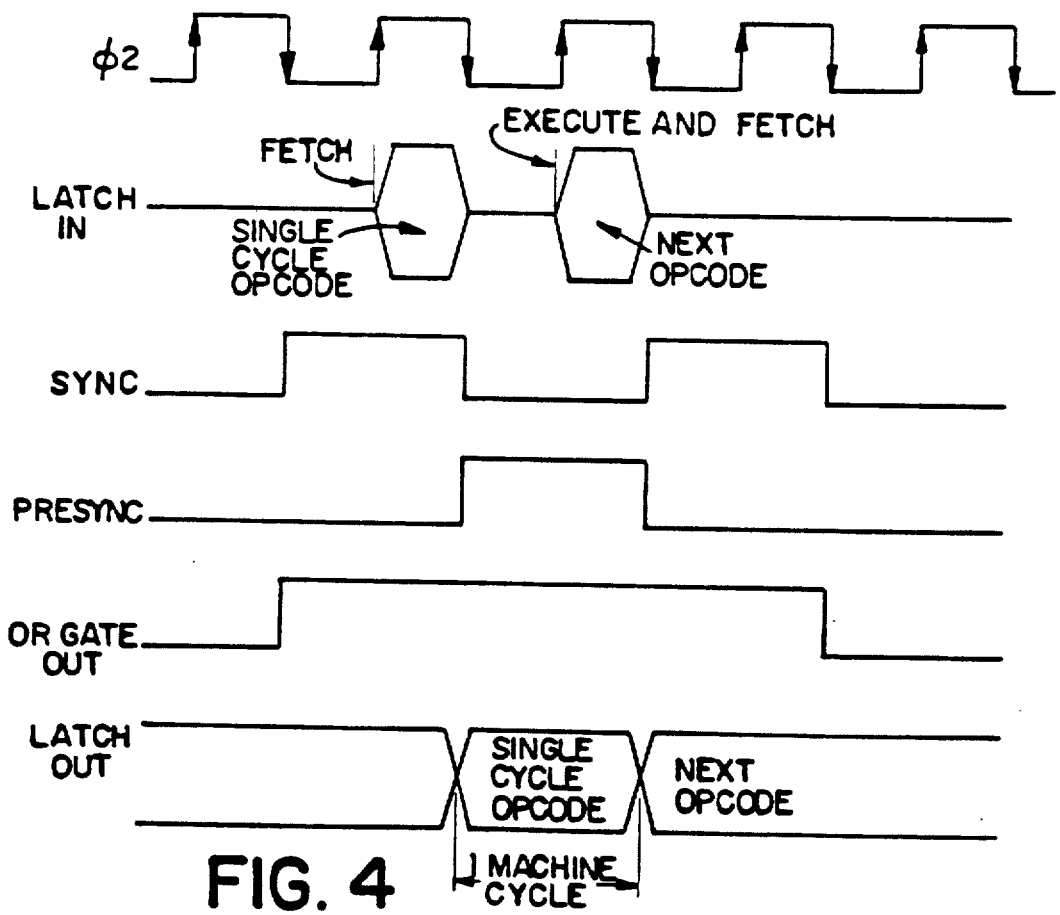
FIG. 4 is a group of waveforms showing operation of the present invention for a single cycle instruction.

Referring to FIG. 4, there is shown the waveforms corresponding to operation according to the present invention. A single cycle byte opcode contains a bit pattern which indicates that the instruction can be executed in a single machine cycle. The bit pattern is decoded by the pre-decode circuit 18 which generates the PRESYNC pulse in the very next machine cycle, i.e., between successive SYNC pulses. The microprocessor fetches the next opcode during the PRESYNC pulse as indicated by the output of OR gate 20. The PRESYNC pulse conditions the latch gate G so that the next clock pulse $\phi_2$ transfers the fetched opcode from latch IN to latch OUT (PLA IN) for execution by the PLA during the very next machine cycle.

In the example described herein, the latch gate (G) must be "high" for the falling edge of the clock pulse ($\phi_2$) to transfer information from latch IN to latch OUT. It should be appreciated, however, that other logic levels and pulse transitions can be employed to provide the same result.

The present invention guarantees the presence of a PRESYNC pulse between successive SYNC Pulses, i.e., during the machine cycle in which a single cycle instruction is executed, whereby the next instruction can be fetched during that machine cycle and executed during the very next machine cycle. The speed at which program instructions can be executed is thereby significantly increased by the present invention. The invention requires few additional logic components; and space demands on the microprocessor chip are slight.

The present invention may be embodied in other specific forms without departing from the spirit or essential attributes thereof and, accordingly, reference should be made to the appended claims, rather than to the foregoing specification, as indicating the scope of the invention.

We claim:

1. A system for accelerating execution of program instructions by a microprocessor provided with memory, a data bus for carrying opcodes fetched from the memory, and a control unit for generating a SYNC pulse train for controlling execution of the opcodes over one or more machine cycles, comprising:
   a latch for transferring a fetched opcode from the data bus to the control unit, said control unit transferring said fetched opcode tot he microprocessor for execution,
   a pre-decode circuit for detecting a coded bit pattern in a first fetched opcode transferred from the latch to the control unit and determining the number of machine cycles required for transferring and executing the first fetched opcode, and if the number of machine cycles required for transferring and executing the first fetched opcode equals one, generating a PRESYNC signal at the beginning of the next machine cycle immediately following transferring and executing the first fetched opcode, and
   means for causing the latch to transfer a second fetched opcode in between successive SYNC signals and during the PRESYNC signal to the control unit within one machine cycle of transferring and executing said first fetched opcode whereby said second fetched opcode commences transferring and executing at the next machine cycle immediately following transferring and executing the first fetched opcode.

2. A system for accelerating execution of program instructions by a microprocessor provided with memory, a data bus for carrying opcodes fetched from the memory, and a control unit for generating a SYNC pulse train for controlling execution of the opcodes during one or more machine cycles, comprising:
   a latch for transferring a fetched opcode from the data bus to the control unit, said control unit transferring said fetched opcode tot he microprocessor for execution,
   a pre-decode circuit for detecting a coded bit pattern in a first fetched opcode transferred from the latch to the control unit and for generating a PRESYNC signed based thereon, and
   logic means for causing the latch to transfer a second fetched opcode to the control unit during an interval between successive SYNC pulses in said pulse train in response to said PRESYNC signal generated therebetween, whereby upon transferring and executing the first fetched opcode, the second fetched opcode is transferred and executed during the machine cycle immediately following transferring and executing the first fetched opcode.

3. The system according to claim 2, wherein said means for causing the latch to transfer said second fetched opcode to the control unit during the generation of the PRESYNC signal includes means for logically combining said SYNC pulse train and said PRESYNC signal, whereby either said SYNC signal or said PRESYNC signal is being generated.

4. A method of accelerating execution of program instructions by a microprocessor provided with memory and a control unit for controlling execution of opcodes during one or more machine cycles, comprising:
   coding a first opcode to indicate that the opcode can be executed within a predetermined period of time,
   fetching the first opcode from the memory and transferring the first fetched opcode to the control unit,
   decoding said first fetched opcode and determining the number of machine cycles required for transferring and executing the first fetched opcode, and if the number of machine cycles required for transferring and executing the first fetched opcode equals a predetermined number, generating a PRESYNC signal at the beginning of the next machine cycle following transferring and executing the first fetched opcode,
   fetching a second opcode from memory and transferring said second fetched opcode to the control unit within a predetermined period of time immediately following transferring and executing said first fetched opcode, whereby upon transferring and executing the first fetched opcode, the second fetched opcode is transferred and executed during the machine cycle immediately following transferring and executing the first fetched opcode.

5. The method according to claim 4, including generating a SYNC pulse train and wherein said step of transferring said second opcode to the control unit during the generation of the PRESYNC signal includes logically combining said SYNC pulse train and said PRESYNC signal, such that either said SYNC signal or PRESYNC signal is being generated.

6. A system for accelerating execution of program instructions by a microprocessor provided with a memory, a data bus for carrying opcodes fetched from the memory, and a control unit for generating a SYNC pulse train for controlling execution of the opcodes over one or more machine cycles, comprising:
   a latch for transferring a fetched opcode from the data bus to the control unit, said control unit transferring said fetched opcode tot he microprocessor for execution,
   a pre-decode circuit for detecting a coded bit pattern in a first fetched opcode indicating that the first fetched opcode can be transferred and executed in a single machine cycle, said pre-decode circuit causing a PRESYNC signal to be generated during intervals between successive SYNC pulses,
   logic means for causing the latch to transfer a second fetched opcode to the latch within one machine cycle of transferring and executing said first fetched opcode in response to the detection of said PRESYNC signal,
   whereby the transfer and execution of the second opcode begins in the next successive machine cycle when said first fetched opcode can be transferred and executed in a single machine cycle.

7. A method of accelerating execution of program instructions by a microprocessor provided with a memory and a control unit for controlling execution of opcodes during one or more machine cycles, comprising:
   coding a first opcode to indicate the number of machine cycles necessary for its transfer and execution,
   generating a SYNC pulse no less than every other machine cycle,
   fetching the first opcode from the memory and transferring the first fetched opcode to the control unit,
   decoding said first fetched opcode to determine the number of machine cycles in which it can be transferred and executed and generating a PRESYNC signal when the first fetched opcode can be transferred and executed within one machine cycle,
   fetching a second opcode from memory in response to the presence of the PRESYNC or SYNC signal if no PRESYNC signal is generated and transferring said second fetched opcode to the control unit in the next machine cycle following the transfer and execution of said first fetched opcode.

* * * * *